H. S. NICHOLSON AND W. C. BEISWINGER.
STEAM TRAP.
APPLICATION FILED JAN. 6, 1919.
1,302,833.
Patented May 6, 1919.
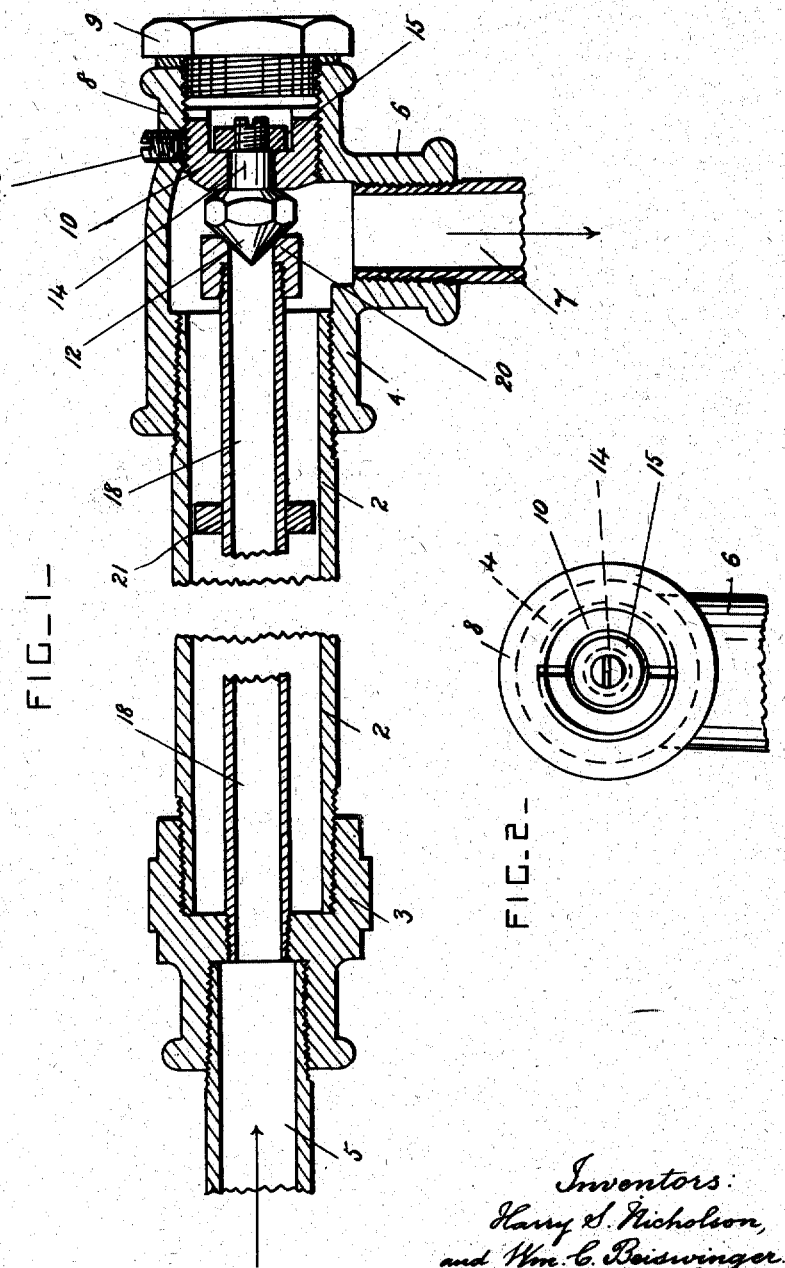
Inventors:
Harry S. Nicholson,
and Wm. C. Beiswinger.
by Herbert W. Jenner
Attorney.

UNITED STATES PATENT OFFICE.

HARRY SAMUEL NICHOLSON AND WILLIAM CRAIG BEISWINGER, OF WILKES-BARRE, PENNSYLVANIA, ASSIGNORS TO W. H. NICHOLSON AND COMPANY, OF WILKES-BARRE, PENNSYLVANIA, A CORPORATION OF PENNSYLVANIA.

STEAM-TRAP.

1,302,833.   Specification of Letters Patent.   Patented May 6, 1919.

Application filed January 6, 1919. Serial No. 269,817.

*To all whom it may concern:*

Be it known that we, HARRY S. NICHOLSON and WILLIAM C. BEISWINGER, citizens of the United States, residing at Wilkes-Barre, in the county of Luzerne and State of Pennsylvania, have invented certain new and useful Improvements in Steam-Traps, of which the following is a specification.

This invention relates to steam traps for use in connection with heating systems; and it consists in the novel construction and combination of the parts hereinafter fully described and claimed, whereby the steam pipes are relieved of air and water and the steam is automatically prevented from escaping.

In the drawings, Figure 1 is a longitudinal section through a steam trap constructed according to this invention. Fig. 2 is an end view of the same with the cap removed to show the valve carrier.

The trap is provided with a casing comprising a straight pipe 2, of iron or similar material, an inlet coupling 3 secured to one end of the pipe, and an outlet coupling secured to its other end. The inlet coupling 3 has the inlet pipe 5 secured to it, and the outlet coupling 4 has a lateral branch 6 to which the outlet pipe 7 is secured. The end portion 8 of the outlet coupling 4 is arranged in line with the pipe 2 and is closed by a removable plug or cap 9.

An adjustable cage or carrier 10 for the valve 12 is screwed into the end portion 8, and its position can be adjusted by a screw driver when the cap 9 is removed. The valve 12 is preferably a conical valve provided with a revoluble stem 14 and nut 15 for holding it centrally in the carrier 10. A locking screw 16 is provided, and is screwed into a hole on one side of the end portion 8 so as to bear on the valve carrier 10.

An expansion tube 18 of brass or other similar material, which has a greater expansion when heated than the pipe 2, is secured in the coupling 3, and extends longitudinally in the pipe 2.

A valve seat 20 is secured to the free end portion of the expansion tube, and engages with the valve 12. A collar or washer 21 is secured on the expansion tube, and engages loosely with the pipe 2, and operates to preserve the alinement of the expansion tube with the valve.

When the steam trap is cold the valve carrier is adjusted so that the expansion tube is not closed by the valve, and so that air and water are free to pass through the expansion tube to the outlet pipe. When the steam heats the steam trap the expansion tube 18 automatically closes the outlet through the valve seat, the adjustment being such that the valve seat is pressed into engagement with the valve when steam begins to pass out of the outlet pipe 7.

The adjustment of the valve can be effected without disturbing any pipe connections by merely removing the cap 9. The revoluble connection of the valve with its carrier permits the carrier to be adjusted without revolving the valve. The valve stem and the valve carrier are each provided with notches or other devices for the screwdriver or other adjusting tool to engage with, and the valve can be revolved so as to free it and its seat from dirt without revolving the valve carrier.

What we claim is:

1. A steam trap, comprising a casing provided with an inlet and an outlet, an expansion tube secured to one end portion of the casing and provided with a valve seat at its free end, a longitudinally adjustable valve carrier supported in the other end portion of the casing, a valve engaging with the valve seat and having a non-slidable stem which is journaled centrally in the said valve carrier, and a locking screw engaging with the casing and bearing against one side of the said valve carrier.

2. A steam trap, comprising a casing provided with an inlet and an outlet and having an internally screwthreaded portion at one end, an expansion tube secured to the other end portion of the casing and provided with a valve seat at its free end, an adjustable valve carrier screwed into the said screwthreaded portion of the casing, a valve engaging with the valve seat and having a non-slidable stem which is journaled centrally in the said valve carrier, a locking screw engaging with the casing and bearing against one side of the valve carrier, and a screwthreaded plug or cap which closes the end of the casing beyond the said valve carrier.

In testimony whereof we affix our signatures.

HARRY SAMUEL NICHOLSON.
WILLIAM CRAIG BEISWINGER.

Copies of this patent may be obtained for five cents each, by addressing the "Commissioner of Patents, Washington, D. C."